(12) United States Patent
David et al.

(10) Patent No.: US 8,942,850 B2
(45) Date of Patent: Jan. 27, 2015

(54) METHOD AND SYSTEM FOR ASSISTING IN THE HANDLING OF ROBOTIZED MACHINES IN A CONGESTED ENVIRONMENT

(75) Inventors: Olivier David, Igny (FR); Yvan Measson, Paris (FR); Francois-Xavier Russotto, Meudon (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 269 days.

(21) Appl. No.: 13/582,671

(22) PCT Filed: Feb. 11, 2011

(86) PCT No.: PCT/EP2011/052076
§ 371 (c)(1),
(2), (4) Date: Sep. 27, 2012

(87) PCT Pub. No.: WO2011/107337
PCT Pub. Date: Sep. 9, 2011

(65) Prior Publication Data
US 2013/0218336 A1 Aug. 22, 2013

(30) Foreign Application Priority Data
Mar. 2, 2010 (FR) .................................... 10 00851

(51) Int. Cl.
*B25J 3/00* (2006.01)
*B25J 9/16* (2006.01)
*B25J 19/02* (2006.01)

(52) U.S. Cl.
CPC *B25J 3/00* (2013.01); *B25J 9/1671* (2013.01); *B25J 9/1689* (2013.01); *B25J 19/023* (2013.01); *Y10S 901/49* (2013.01)
USPC .............................. 700/253; 700/248; 901/49

(58) Field of Classification Search
CPC .......... B25J 19/023; B25J 3/00; B25J 9/1671; B25J 9/1689
USPC ................. 700/245, 248, 249, 250, 253, 255; 901/49
See application file for complete search history.

(56) References Cited

U.S. PATENT DOCUMENTS 5,808,887 A 9/1998 Dorst et al.

FOREIGN PATENT DOCUMENTS

| JP | 61-230896 A | 10/1986 |
|---|---|---|
| JP | 6215091 A | 1/1987 |

(Continued)

OTHER PUBLICATIONS

M. Baumann et al.: "Path Planning for Improved Visibility Using a Probabilistic Road Map," IEEE Transactions on Robotics, IEEE Service Center, Piscataway, NJ, US, vol. 26, No. 1, Feb. 1, 2010, pp. 195-200.

(Continued)

*Primary Examiner* — Khoi Tran
*Assistant Examiner* — Adam Mott
(74) *Attorney, Agent, or Firm* — Baker & Hostetler LLP (57) ABSTRACT

A method for handling of a first robotized mobile machine moving in a congested working environment under the control of a second robotized mobile machine, providing the operator, in real time, with a relevant view of the working scene, even if an object intrudes into the field of view of the camera and thereby obscures the operator's view. This method is based on use of properties of a physics engine of the constraint resolution type. For each object in the scene, the physics engine has a physical representation of said object in the form of a mesh. The engine calculates a wrench on the basis of the respective positions and velocities of two objects. In case of a collision between the manipulator and a fixed object in the scene, the engine determines the wrench to be applied to the manipulator in order to make it avoid the object.

15 Claims, 4 Drawing Sheets

(56) References Cited

FOREIGN PATENT DOCUMENTS

| JP | 3-287394 A | 12/1991 |
| JP | H03-287394 A | 12/1991 |
| JP | 4-30981 A | 2/1992 |
| JP | 6-15594 A | 1/1994 |
| JP | H07-194609 A | 8/1995 |
| JP | 2007-090481 A | 4/2007 |
| WO | 2007/067167 A1 | 6/2007 |

OTHER PUBLICATIONS

E. Marchand et al.: "Dynamic Sensor Planning in Visual Servoing," Robotics and Automation, 1998. Proceedings. 1998 IEEE International Conference on Leuven, Belgium May 16-20, 1998, New York, NY, USA, IEEE, US, vol. 3, May 16, 1998, pp. 1988-1993.
Japanese Refusing Reason Notice issued in JP Patent Application No. 2012-555350 mailed Jul. 22, 2014.

METHOD AND SYSTEM FOR ASSISTING IN THE HANDLING OF ROBOTIZED MACHINES IN A CONGESTED ENVIRONMENT

CROSS-REFERENCE TO RELATED APPLICATIONS

This application is a National Stage of International patent application PCT/EP2011/052076, filed on Feb. 11, 2011, which claims priority to foreign French patent application No. FR 10 00851, filed on Mar. 2, 2010, the disclosures of each of which are incorporated by reference in their entireties.

FIELD OF THE DISCLOSED SUBJECT MATTER

The present invention relates to a method and a system for assisting in the handling of robotized machines in a congested environment, particularly in the context of a remote handling process.

BACKGROUND

Remote handling is the remote control by a human operator of a manipulator arm, a mobile machine or any other articulated powered device. In the remainder of the description, a device of this type is denoted by the term "manipulator". In a complete remote handling system, the human operator interacts remotely with the manipulator by means of an articulated master arm whose movements are captured, transmitted and reproduced by the manipulator. To perform this manipulation in real time, the operator requires continuous high-quality visual feedback on the working environment which enables him to execute the current task accurately and in a completely safe way. This visual viewpoint is delivered by a camera mounted on the system which includes the manipulator. This camera can be positioned on the end of the manipulator arm if a precise local viewpoint of the operating area is desired. However, this positioning has the drawback of limiting the operator's field of view and cannot give him an overall view of his working environment. To ensure that the operation takes place in a completely safe way, it is often necessary to have a second viewpoint which shows the manipulator in the overall scene. This overall viewpoint is generally obtained by means of a motorized camera of the PTZ ("Pan Tilt Zoom") type.

One of the problems to be resolved in a remote handling system is that of providing the operator at all times with a relevant viewpoint onto an area of interest. For some applications, the environment in which the manipulator moves is entirely known and is under control and free of obstacles. In this case, solutions using one or more fixed cameras in the environment may be adequate. However, if a moving point is to be followed, this point may be located outside the field of view, or may be concealed by the presence of objects in the environment or even by the manipulator itself. In such cases the image delivered to the operator is unusable. One way of overcoming this problem is to use a motorized camera, such as a PTZ (Pan Tilt Zoom) camera. A second operator, capable of controlling the movement of the motorized camera, can then update the line of sight of the camera manually. This method can also be automated by making the camera viewpoint dependent on the area of interest, whose position is known in advance. When the manipulator makes a movement, the position of the point of interest is converted to a viewpoint set point for the camera. The viewpoint of the camera is then updated as a function of this set point. This method produces good results when the line of sight of the camera is clear.

The problem to be resolved by the present invention is therefore that of providing an operator, who is manipulating an object remotely, with a real-time relevant image of the scene in which he is working. A known solution to this problem is that of placing a camera on a second robotized machine whose position is updated by a second operator. However, this solution is unsatisfactory, as it requires human intervention. The production of this image, and indirectly the adjustment of the camera viewpoint, must be carried out automatically, without including a second operator responsible for continuously correcting the viewpoint to obtain a clear field of view onto the object to be manipulated.

Various known prior art methods have been developed to overcome the aforesaid problem.

The most easily implemented solutions for giving the operator a relevant viewpoint are of the type described in International Patent Application WO 2007/067167. The target is located by means of a transmitter positioned on it and a receiver coupled to the motorized camera. The transmitter transmits the position of the target in real time to the receiver, which communicates this information to the system responsible for updating the orientation of the camera to ensure that its line of sight is always aimed toward the target. This device is simple, but cannot provide a relevant image for the operator if masking obstacles are present between the camera and the target. This type of solution is unsuitable, as the environment is not taken into consideration.

A different solution is developed in the article "Dynamic Sensor Planning in Visual Servoing", by Eric March and and Greg D. Hager, ICRA '98. In this solution, a viewpoint free of obstacles is obtained by means of a camera mounted on a robotized arm, with the aim of enabling the target object to be grasped subsequently without difficulty. The operations described in this document use the known methods of visual servoing. These methods are based on the definition of cost functions which are to be minimized. The function cost is declared to be minimal when the target objects are located in the centre of the image and the masking objects are at the periphery of the image or outside it. The aim is then to adapt the position of the robotized machine continuously so that the projection of the target object on the image and therefore its representative surface in the image is always as large as possible in proportion with respect to the other objects in the scene.

Another known prior art solution uses what are known as model-referenced path planning methods. Based on a geometrical model of the scene, these methods seek a means for connecting a point A to a point B while avoiding the obstacles. An example of an embodiment of this method is described in U.S. Pat. No. 5,808,887. By applying this method to the problem of remote handling, it is possible to determine the new camera position which is closest to its starting point while allowing a straight line to be drawn without any interference caused by an obstacle between the target and the new camera position.

A considerable drawback of visual servoing and path planning methods is that both methods are very demanding in terms of computing power, which limits their use for real time applications. Furthermore, the major problem of visual servoing methods is that they are dependent on image quality and require a high level of contrast between the various objects in the scene if an effective solution is to be found. They are also highly sensitive to the effects of light, causing problems in a context in which the camera support is movable and the incidence of light on the objects in the scene is variable.

SUMMARY

The object of the present invention is, notably, to resolve the aforesaid limitations of the prior art by proposing a solution which is economical in terms of computing power and is not sensitive to the image quality, the illumination or the contrast of the scene.

Accordingly, the present invention proposes a method for assisting in the handling of at least a first robotized mobile machine moving in a congested working environment under the control of at least a second robotized mobile machine, such as a sensor or a tool interacting with said environment, the method being characterized in that it includes at least the following steps:

- the modeling of a virtual three-dimensional representation of the working environment and of the real objects contained therein,
- the determination of a target point in the working environment toward which the line of sight of said second robotized mobile machine is oriented,
- the determination of a reference point of the position of said second robotized mobile machine,
- the construction, within said virtual representation, by means of a physics engine, of a virtual mechanism extending axially between the target point and the reference point and substantially incorporating the segment connecting these two points to which it is virtually connected by mechanical links,
- the detection, by means of a physics engine, of a collision between said virtual mechanism and a real object in the working environment whose position is found on the basis of said virtual representation,
- the calculation of a wrench applied to said virtual mechanism resulting from its collision with said real object, the position of said target point remaining unchanged,
- the determination of the new position of said virtual mechanism in the working environment,
- the determination of the new position of said reference point of said second robotized mobile machine, based on the new position of said virtual mechanism, in such a way that the line of sight between said reference point and said target point is free of obstacles.

In a variant embodiment of the invention, said first robotized mobile machine is an articulated arm and said target point is substantially located at the end of said arm.

In another embodiment of the invention, said virtual mechanism has a cross section which substantially occupies the field of sight of said second robotized mobile machine.

In another embodiment of the invention, said virtual mechanism is composed of a set of telescopic cylinders.

In another embodiment of the invention, the mechanical link between said virtual mechanism and said first robotized mobile machine at the target point is a link of the swivel type.

In another variant embodiment of the invention, the mechanical link between said virtual mechanism and said first robotized mobile machine at the target point is formed by means of a position control system, such that said target point can be modified in the course of the handling.

In another variant embodiment of the invention, said second robotized mobile machine is a camera and said reference point is located on the optical axis at a distance from the camera substantially equal to its focal length.

In another variant embodiment of the invention, said second robotized mobile machine is a telemetric laser or a high-pressure cleaner.

In another variant embodiment of the invention, said second robotized mobile machine includes an articulated arm.

In another variant embodiment of the invention, said reference point is connected virtually to a point fixed to said second robotized mobile machine by means of a virtual mechanical link of the spring type.

In another variant embodiment of the invention, said first robotized mobile machine is handled remotely by an operator.

The invention also proposes a remote handling system for the remote handling of at least a first robotized machine moving in a congested working environment by means of an articulated master arm actuated by an operator, the movements of said master arm being reproduced by said first robotized machine using means for capturing, transmitting and reproducing the movements, characterized in that it also includes at least a second robotized mobile machine actuated by control means, a database containing a virtual three-dimensional representation of the working environment, a software physics engine adapted to detect and analyze the collisions between two objects present in said environment, and means for using the method according to the invention for assisting in the remote handling of said first robotized machine.

In a variant embodiment of the invention, said first robotized machine includes an articulated arm.

In a variant embodiment of the invention, said second robotized mobile machine is a camera, a telemetric laser or a high-pressure cleaner which may or may not be coupled to an articulated arm.

In a variant embodiment of the invention, said virtual three-dimensional representation is produced by computer-aided design software.

BRIEF DESCRIPTION OF THE DRAWINGS

Other characteristics will be made clear by the following detailed description, given by way of non-limiting example with reference to the appended drawings, in which.

DETAILED DESCRIPTION

Figure 1:
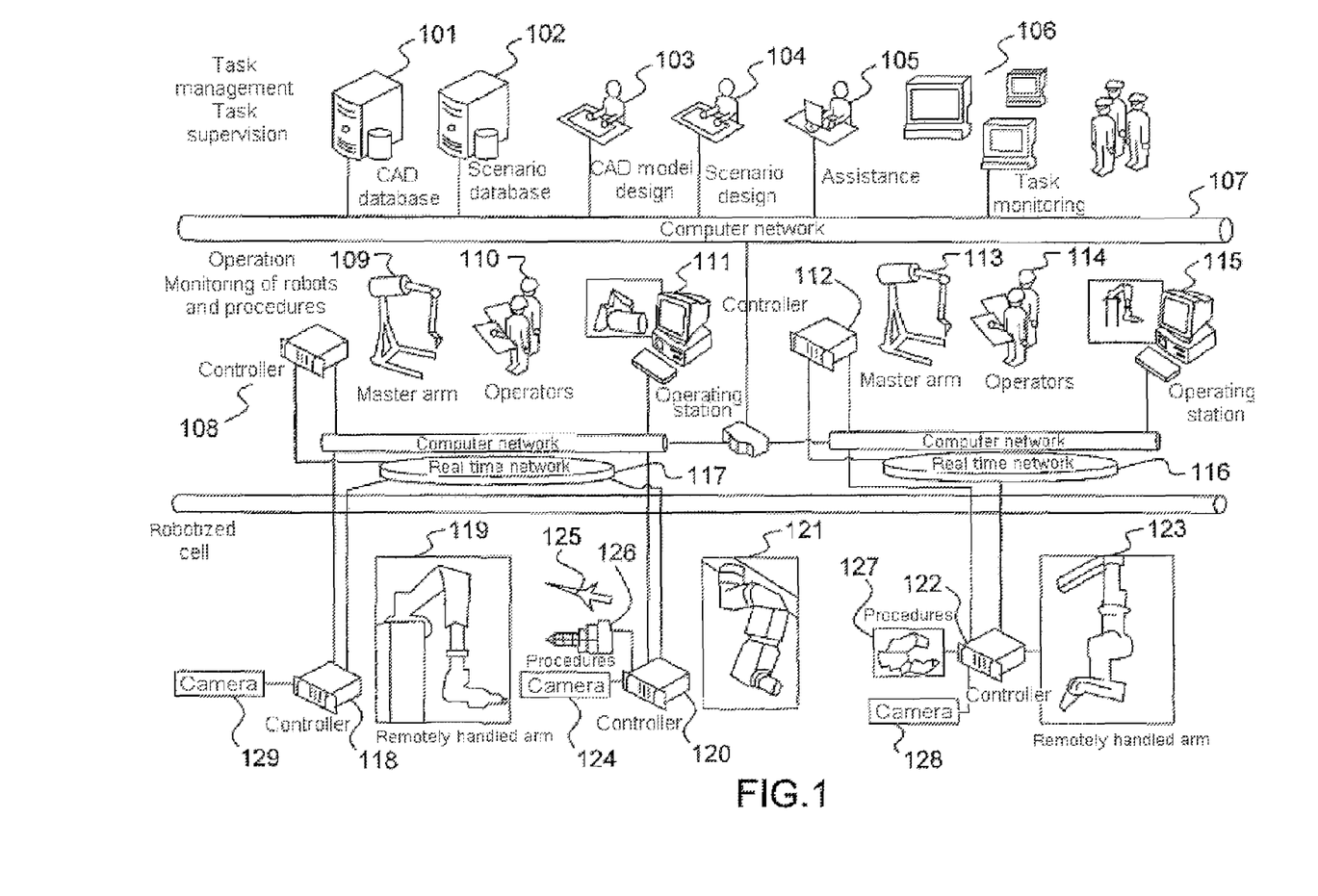
FIG. 1 is a functional diagram of a set of remote handling systems using the invention.

FIG. 1 is a synoptic diagram of a set of remote handling systems used for a robotized operation. The invention is applicable, notably, to one or more of these systems.

In this example, one or more operators 110,114 remotely handle one or more robotized articulated arms 119, 121, 123. A manipulator arm of this type can be used to grasp and handle objects remotely. Without departure from the scope of the invention, a remote handling system can also include other remotely operated robotized devices such as a gripper 127 or any type of tool 125 allowing the operator to interact with the working environment in which the aforesaid device, such as an angle grinder, a cutter, a powered screwdriver or a welding torch, moves. The remainder of the description will be limited to the exemplary embodiment of the invention which relates to a remotely handled articulated arm.

A robotized remote handling operation using the method according to the invention can be broken down in functional terms into three subsets: a management cell, a set of operating stations, and the robotized cell which is located at a distance from the operators in the working scene and in which the real operations take place.

The management cell is used for preparing the operation, for outlining scenarios and creating three-dimensional models of the working scene which will provide support during the progress of the operations. This cell includes at least one station 103 for designing virtual models of the working scene coupled to a database 101. This design can be carried out using computer-aided design (CAD) software. The aim is to provide, in a phase preceding the execution of the method according to the invention, a representation in the form of a virtual three-dimensional model of the working scene in which the remotely handled machine will move. This representation includes, notably, all the objects initially present in the working environment. A scenario design station 104 coupled to a database 102 is used for the preliminary definition of operating scenarios which can be composed, notably, of nominal production tasks, preventive or nominal maintenance, or operations to be performed in accidental situations. Finally, this cell also includes an assistance station 105 and a supervision station 106. The elements of the management cell and the operating cells are interconnected by computerized means 107.

The operating cell includes at least one operator 110, 114, who interacts remotely with the working scene by means of a master arm 109, 113, and an operating station 111, 115, which enables the current representation of the manipulator in the virtual world to be displayed by means of human-machine interfaces and video feedback transmitted by at least one camera 124, 128, 129 installed in the operational area. In more advanced systems, the master arm 109, 113 has a spatial force feedback system enabling the operator's perception to be improved. In this case, the operator can sense the forces he imparts to the environment by means of the remotely handled system. Each master arm 109, 113 is connected to a controller 108, 112 which serves, notably, to transmit and receive the position and movement information enabling the master arm and the manipulator arm 119, 121, 123 to interact. For this purpose, the controller 108, 112 of the master arm is connected, via a real time network 116, 117, to an equivalent controller 118, 120, 122 which controls the manipulator arm 119, 121, 123 or slave arm. The movements of the master arm are captured in real time by means of articular position sensors such as resolvers, encoders, potentiometers or passive electrical sensors of the LVDT (Linear Variable Differential Transformer) type.

In addition to the aforesaid elements, the robotized cell includes a camera 124, 128, 129, associated with each manipulator 119, 121, 123 and preferably positioned on a second articulated arm. This camera has the function of providing a relevant viewpoint onto the working scene for the operator, and is connected for this purpose to the controller 118, 122, 124 which transmits the video sequence to the operating station 111, 115 by means of the computer network 107.

When the manipulator moves in its working environment, and particularly when the environment is congested, any collisions between the manipulator and its environment must be monitored automatically in order to provide optimal safety. This monitoring is carried out by a software physics engine. The primary function of a physics engine is to simulate physical phenomena. Its function is, on the one hand, to detect and control collisions between two objects in the virtual representation of the working scene, and, on the other hand, to solve systems of equations of the physical phenomena to be represented. In the system according to the invention, the physics engine is of the so-called constraint resolution type. For each object in the scene, the physics engine has a physical representation of said object in the form of a mesh. The engine calculates a wrench on the basis of the respective positions and velocities of two objects. In case of a collision between the manipulator and a fixed object in the scene, the engine determines the wrench to be applied to the manipulator in order to make it avoid the object instead of striking it. A constraint is imposed on the movement of the manipulator, but there is no stoppage due to collision. The physics engine determines the forces to be applied to each object to enable the system to find an equilibrium position.

Depending on the requirements of the application, the physics engine may be run at the operating station 111, 115 if the constraints relating to a real time execution are flexible, or directly in the real time network 116, 117 if strict real time operation is necessary. Without departure from the scope of the invention, the physics engine can also allow the operator to sense forces not only on real elements but also in the virtual representation of the scene. Thus the movements of the remotely handled engine can be constrained in a direction which facilitates the task to be performed.

As explained above, the technical problem to be resolved by the present invention is that of providing the operator, in real time, with a relevant view of the working scene, even if an object intrudes into the field of view of the camera and thereby obscures the operator's view.

The solution used by the method according to the invention is based on the use of the properties of the physics engine described above, which is installed in the remote handling system for monitoring purposes.

Figure 2:
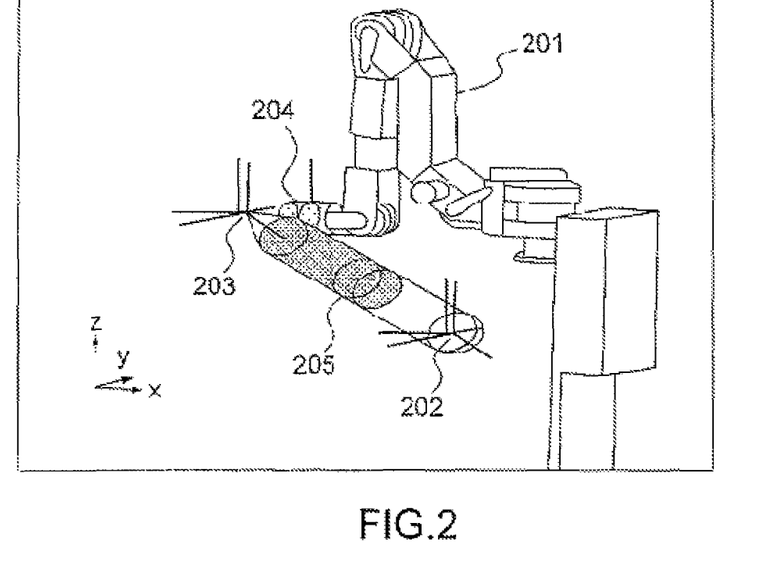
FIG. 2 is a representation of the manipulator and of the field of view of the camera.

FIG. 2 shows a schematic example of the use of the method according to the invention for the purpose of visual representation of the working scene. An articulated arm 201 is remotely operated to handle an object represented by a target point 203. A camera, preferably positioned on a second arm which is not shown, films the target point in order to provide the operator with a precise view of his working environment. The camera is represented in FIG. 2 by its focal point 202.

A virtual mechanism 205, embodying the field of view of the camera, is added to the virtual representation of the scene, in the same way as any other object or element in the scene. In the remainder of the description, the term "mechanism" is used to denote a combination of parts or members arranged for the purpose of collective movement or operation. The virtual model design means implemented in the management cell are used to create this mechanism 205. This virtual mechanism 205, which has no real existence, is designed so as to extend axially between the focal point of the camera 202 and the target point 203, thus essentially occupying the field of view of the camera. In a variant embodiment of the invention, the point 202 acting as a reference for the positioning of the camera can also be a point located on the focal axis of the camera, at a distance from the camera substantially equal to the focal length. The mechanism 205 is defined by a mesh whose geometry is perfectly known, in the same way as the other objects in the scene which are representations of real objects. It may be composed, for example, of a set of telescopic cylinders, as shown in FIG. 2, having a total length equal to the distance between the focal point 202 and the target point 203 and a diameter equal to a value which is predetermined as a function of the field of view of the camera. The shape of the virtual mechanism 205 is not limited to a set of cylinders. In particular, it can have a constant cross section of any shape, including circular, hexagonal, and rectangular, and can also have a cross section varying in such a way that the mechanism 205 forms a cone or a truncated cone.

The virtual mechanism 205 is connected by virtual mechanical links to the focal point 202 and the target point 203 and, in the exemplary embodiment shown in FIG. 2, the ends of said mechanism move, on the one hand, with the movement of the end of the manipulator 201, and, on the other hand, with the focal point of the camera 202. This mechanism 205 is taken into account by the physics engine as if it were real. Thus, collisions between the virtual mechanism 205 and other objects in the scene or part of the articulated arm 201 are detected by the physics engine. The engine determines the force to be applied to the virtual mechanism 205 following a contact with another object, and consequently its new position after collision with said object. The movement of the virtual mechanism 205 then results indirectly in the movement of the focal point of the camera to which it is attached, with the constraint that the target point is attached to the area of interest. Starting from the new position of the virtual mechanism 205, an updated position of the camera 202 is determined, and this position is transmitted in the form of a Cartesian position set point to the controller 118 which then controls the movement of the camera 202 toward its new position, so as to provide the operator with a viewpoint free of obstacles, either by means of the real camera or by means of a virtual camera which calculates a representation of the geometrical model viewed from the point in question.

By introducing the virtual mechanism 205 into the working environment and taking into account the collisions of this object with other elements, it is possible to ensure that no real object can be present in superimposition with the virtual mechanism. Since the virtual mechanism is designed to occupy the field of view of the camera which is aimed toward the target point of which a relevant view is to be provided, this ensures that the field of view of the camera is always free of obstacles and the operator will never experience obstruction. As soon as a collision occurs between the virtual mechanism 205 and a real object, the physics engine determines the new position of the virtual mechanism 205, and indirectly that of the focal point of the camera, which moves to permit the best view.

In a variant embodiment of the invention, the focal point 202 of the camera is virtually constrained to a fixed reference point, for example a point fixed to the base of the second articulated arm which supports the camera, by a mechanical link of the spring type, in order to constrain the movement of the camera and deliberately limit its movements. This is because the visual comfort of the operator is improved if the movements of the camera are limited, and furthermore the movement of the camera is restricted by mechanical limitations.

In another variant embodiment of the invention, the mechanical link between the virtual mechanism 205 and the articulated arm 201 at the target point 203 is established permanently. It extends the kinematic description of the articulated arm 201 in such a way that, in the three-dimensional model, the manipulator arm 201 and the virtual mechanism 205 form a single mechanism. To limit the camera movements, they are then interconnected at the target point by a mechanical link of the swivel type 204 introduced into the three-dimensional model of the scene.

In another variant embodiment of the invention, the link between the virtual mechanism 205 and the articulated arm 201 at the target point 203 is formed by means of a position control system such that the target can be changed during the performance of the task.

In another variant embodiment of the invention, the camera can be replaced by any type of sensor or tool which requires a clear field between the target point and itself, for example a telemetric laser or a high-pressure water jet cleaner.

Figure 3A:
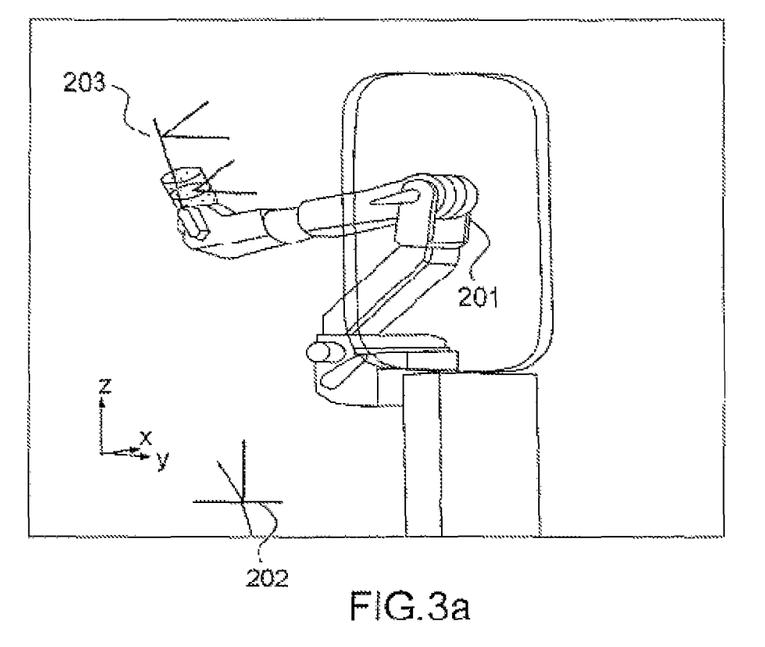
FIG. 3a is a general view of the manipulator during the execution of a task.

FIG. 3a shows the positioning of the manipulator 201 used for the maintenance of a tunnel boring machine. The camera is represented by its focal point 202 which is fixed. The target point 203 is located at the end of the articulated arm.

Figure 3B:
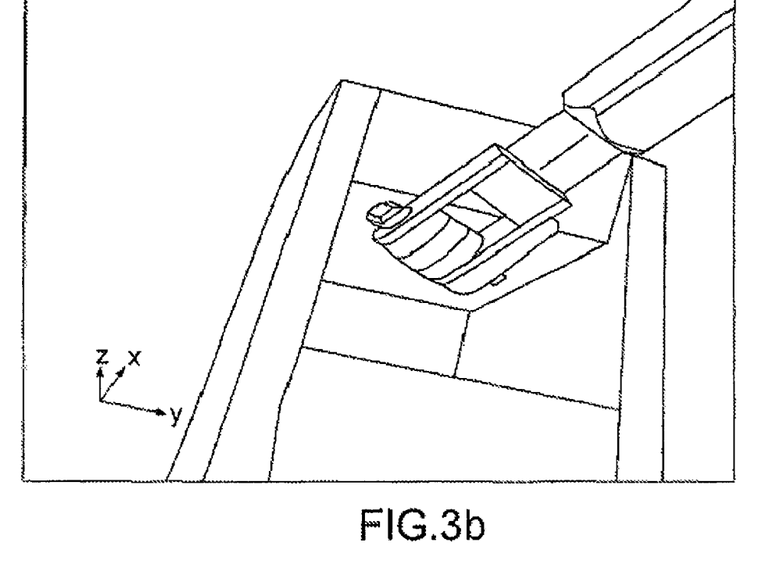
FIG. 3b is a representation of the view obtained with a camera with no allowance for problems of masking.

FIG. 3b shows the view obtained by the camera in the scenario of FIG. 3a. It can be seen that the target is obscured by the manipulator which is located in the field of view of the camera.

Figure 4A:
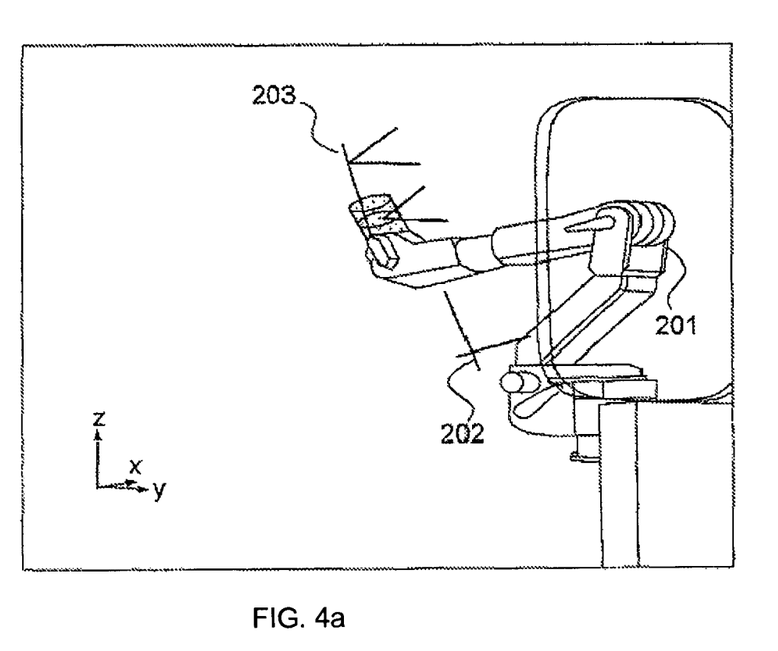
FIG. 4a is the same general view as that of FIG. 3a, with a camera using the method according to the invention.

FIG. 4a shows a scenario in which the method according to the invention is used for the automatic determination of the most relevant positioning of the focal point 202 of the camera, in order to maintain a free field of view of the target point at all times. It can be seen that the focal point 202 has been moved with respect to its initial position in FIG. 3a, so as to clear the field of view of the camera.

Figure 4B:
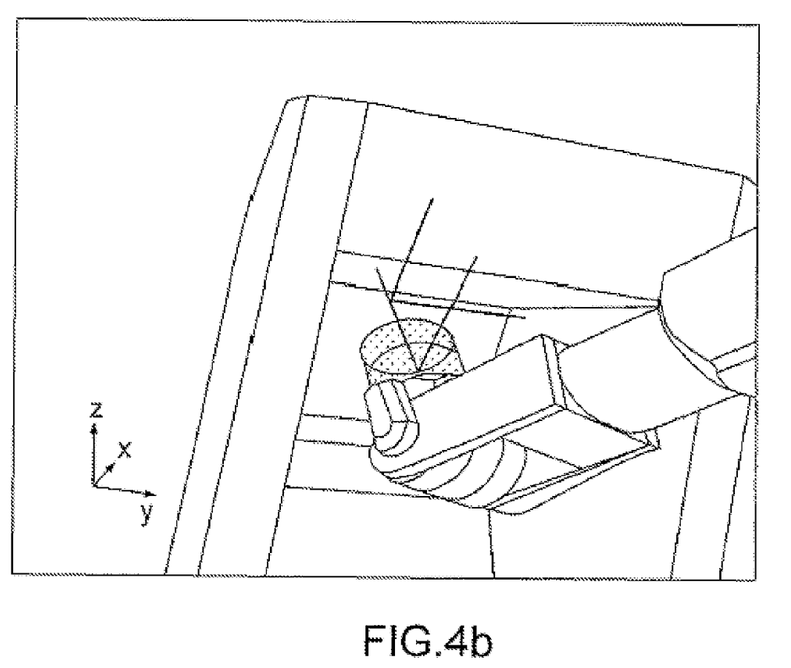
FIG. 4b is the view obtained by the camera using the method according to the invention.

FIG. 4b shows the view obtained by the camera which has been moved automatically to leave its field of view toward the target point free of obstacles when the method according to the invention is used.

The method and system according to the invention enable the operator to be given a relevant view of the working area, by using the properties of a physics engine for collision detection and of a virtual three-dimensional representation of the working scene. The method according to the invention relates to a three-dimensional model of the scene, which has the advantage of being independent of the quality of the filmed image. Without departure from the scope of the invention, the virtual modeling of the scene can be more minimal, as it is not always necessary to provide a highly detailed mesh representation of each object. The modeling must be adequate to enable the physics engine to implement the detection of collisions between two objects. The invention is also applicable to all types of automated systems for which it is necessary to provide a line of view free of obstacles to a robotized machine, such as a sensor or other machine, which interacts with objects in its working environment. In particular, the robotized machine is not necessarily remotely operated by an operator.

The invention claimed is:

1. A method for assisting in the handling of at least a first robotized mobile machine moving in a congested working environment under the control of at least a second robotized mobile machine, the method comprising:

modeling a virtual three-dimensional representation of the working environment and of real objects contained therein;

determining a target point in the working environment toward which a line of sight of said second robotized mobile machine is oriented;

determining a reference point of a position of said second robotized mobile machine;

constructing, within said virtual representation, by means of a physics engine, a virtual mechanism extending axially between the target point and the reference point and substantially incorporating a segment connecting these two points to which it is virtually connected by mechanical links;

detecting, by means of a physics engine, a collision between said virtual mechanism and a real object in the working environment whose position is found on a basis of said virtual representation;

calculating a wrench applied to said virtual mechanism resulting from its collision with said real object, the position of said target point remaining unchanged;

determining a new position of said virtual mechanism in the working environment; and determining a new position of said reference point of said second robotized mobile machine, based on the new position of said virtual mechanism, in such a way that the line of sight between said reference point and said target point is free of obstacles.

2. The method as claimed in claim 1, wherein said first robotized mobile machine is an articulated arm and that said target point is substantially located at the end of said arm.

3. The method as claimed in claim 1, wherein said virtual mechanism has a cross section which substantially occupies the field of view of said second robotized mobile machine.

4. The method as claimed in claim 1, wherein said virtual mechanism comprises a set of telescopic cylinders.

5. The method as claimed in claim 1, wherein the mechanical link between said virtual mechanism and said first robotized mobile machine at the target point is a link of the swivel type.

6. The method as claimed in claim 1, wherein the mechanical link between said virtual mechanism and said first robotized mobile machine at the target point is formed by means of a position control system such that said target point can be modified in the course of the handling.

7. The method as claimed in claim 1, wherein said second robotized mobile machine is a camera and said reference point is located on the optical axis at a distance from the camera substantially equal to its focal length.

8. The method as claimed in claim 1 wherein said second robotized mobile machine is a telemetric laser or a high-pressure cleaner.

9. The method as claimed in claim 1, wherein said second robotized mobile machine includes an articulated arm.

10. The method as claimed in claim 1, wherein said reference point is connected virtually to a point fixed to said second robotized mobile machine by means of a virtual mechanical link of the spring type.

11. The method as claimed in claim 1, wherein said first robotized mobile machine is remotely handled by an operator.

12. A remote handling system for the remote handling of at least a first robotized machine moving in a congested working environment by means of an articulated master arm actuated by an operator, the movements of said master arm being reproduced by said first robotized machine using means for capturing, transmitting and reproducing the movements, the system comprising a second robotized mobile machine actuated by control means;

a database containing a virtual three-dimensional representation of the working environment; and a software physics engine configured to detect and analyze collisions between two objects present in said environment, and means;

modeling the virtual three-dimensional representation of the working environment and of real objects contained therein;

determining a target point in the working environment toward which a line of sight of said second robotized mobile machine is oriented;

determining a reference point of a position of said second robotized mobile machine;

constructing, within said virtual representation, by the software physics engine, a virtual mechanism extending axially between the target point and the reference point and substantially incorporating a segment connecting these two points to which it is virtually connected by mechanical links;

detecting, by the software physics engine, a collision between said virtual mechanism and a real object in the working environment whose position is found on a basis of said virtual representation;

calculating a wrench applied to said virtual mechanism resulting from its collision with the real object, the position of said target point remaining unchanged;

determining a new position of said virtual mechanism in the working environment; and determining a new position of said reference point of said second robotized mobile machine, based on the new position of said virtual mechanism, in such a way that the line of sight between said reference point and said target point is free of obstacles.

13. The remote handling system as claimed in claim 12, wherein said first robotized machine includes an articulated arm.

14. The remote handling system as claimed in claim 12, wherein said second robotized mobile machine is a camera, a telemetric laser or a high-pressure cleaner which may or may not be coupled to an articulated arm.

15. The remote handling system as claimed in claim 12, wherein said virtual three-dimensional representation is produced by computer-aided design software.

* * * * *